United States Patent
Zhang et al.

(10) Patent No.: US 8,665,949 B1
(45) Date of Patent: Mar. 4, 2014

(54) METHODS AND APPARATUS FOR TRANSMISSION OF DATA AT DIFFERENT MODULATION AND/OR CODING RATES

(75) Inventors: Hongyuan Zhang, Fremont, CA (US); Hui-Ling Lou, Sunnyvale, CA (US); Yong Liu, Campbell, CA (US); Raja Banerjea, Sunnyvalle, CA (US)

(73) Assignee: Marvell International Ltd., Hamilton (BM)

( * ) Notice: Subject to any disclaimer, the term of this patent is extended or adjusted under 35 U.S.C. 154(b) by 489 days.

(21) Appl. No.: 12/878,830

(22) Filed: Sep. 9, 2010

Related U.S. Application Data

(60) Provisional application No. 61/240,936, filed on Sep. 9, 2009.

(51) Int. Cl.
*H04B 1/66* (2006.01)
*H04J 3/04* (2006.01)
*H03D 1/00* (2006.01)

(52) U.S. Cl.
USPC .................. 375/240.1; 370/535; 375/341

(58) Field of Classification Search
USPC .................... 375/240, 341; 370/535
See application file for complete search history.

(56) References Cited

U.S. PATENT DOCUMENTS

| | | | | |
|---|---|---|---|---|
| 6,594,439 B2 * | 7/2003 | Imahashi et al. | ............... | 386/241 |
| 7,835,369 B2 * | 11/2010 | Hu et al. | ....................... | 370/400 |
| 8,014,416 B2 * | 9/2011 | Ho et al. | ....................... | 370/431 |
| 2007/0291855 A1 * | 12/2007 | Reznic et al. | ............ | 375/240.27 |
| 2008/0253462 A1 | 10/2008 | Singh et al. | | |
| 2009/0086699 A1 | 4/2009 | Niu et al. | | |
| 2010/0046542 A1 * | 2/2010 | van Zelst et al. | ............... | 370/465 |
| 2011/0176442 A1 * | 7/2011 | Ihm et al. | ....................... | 370/252 |

OTHER PUBLICATIONS

Ngo et al., "TG3c Proposal: UEP for 802.15.3c PHY", Samsung, pp. 1-18, dated Jul. 2007, available at <https://mentor.ieee.org/802.15/file/07/15-07-0701-04-003c-uep-802-15-3c-phy.pdf>.

Singh et al., "Supporting Uncompressed HD Video Streaming without Retransmissions over 60GHz Wireless Networks," Dept. of Electrical and Computer Engineering Conference Proceedings, Southern Illinois University Carbondale, pp. 1938-1944 (2008).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHZ Band," *The Institute of Electrical and Electronics Engineers, Inc.*, (1999).

(Continued)

*Primary Examiner* — Dave Czekaj
*Assistant Examiner* — Tsion B Owens

(57) ABSTRACT

In a method for generating a physical layer (PHY) data unit for transmission via a communication channel, first data and second data that correspond to a unit of audio, video, and/or image information is received. The first data and the second data are encoded and modulated so that a resulting data rate of the first data is less than a resulting data rate of the second data. The first data and the second data are parsed to a plurality of spatial streams, and a single PHY data unit that includes the plurality of spatial streams is generated.

9 Claims, 12 Drawing Sheets

(56) References Cited

OTHER PUBLICATIONS

IEEE Std 802.11b-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical Layer (PHY) extension in the 2.4 GHz band-Corrigendum 1," *The Institute of Electrical and Electronics Engineers, Inc.*, Nov. 7, 2001.

IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, Apr. 2003.

S. A. Mujtaba, "IEEE P802.11—Wireless LANs, TGn Sync Proposal Technical Specification," *The Institute of Electrical and Electronics Engineers, Inc.*, doc.: IEEE 802.11-04/0889r6, May 2005.

Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).

\* cited by examiner

METHODS AND APPARATUS FOR TRANSMISSION OF DATA AT DIFFERENT MODULATION AND/OR CODING RATES

CROSS-REFERENCES TO RELATED APPLICATIONS

This disclosure claims the benefit of U.S. Provisional Patent Application No. 61/240,936, entitled "Video Streaming by 802.11ac," filed on Sep. 9, 2009, which is hereby incorporated by reference herein in its entirety.

FIELD OF THE DISCLOSURE

The present disclosure relates generally to communication networks and, more particularly, to wireless networks that utilize orthogonal frequency division multiplexing (OFDM).

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Wireless local area network (WLAN) technology has evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, and the IEEE 802.11n Standard specifies a single-user peak throughput of 600 Mbps. Work has begun on a new standard, IEEE 802.11 ac, that promises to provide even greater throughput.

SUMMARY

In one embodiment, a method for generating a physical layer (PHY) data unit for transmission via a communication channel includes receiving first data and second data that correspond to a unit of audio, video, and/or image information, and encoding and modulating the first data and the second data so that a resulting data rate of the first data is less than a resulting data rate of the second data. The method also includes parsing the first data and the second data to a plurality of spatial streams, and generating a single PHY data unit that includes the plurality of spatial streams.

In another embodiment, a PHY processing unit for generating a PHY data unit for transmission via a communication channel is disclosed. The PHY processing unit comprises a first encoder to encode first data that corresponds to a unit of audio, video, and/or image information, and a second encoder to encode second data that corresponds to the unit of audio, video, and/or image information. The PHY processing unit additionally comprises a first modulator to modulate the first data, and a second modulator to modulate the second data. Also, the PHY processing unit comprises a stream parser to parse the first data and the second data to a plurality of spatial streams. The PHY processing unit is configured to encode and modulate the first data and the second data so that a resulting data rate of the first data is less than a resulting data rate of the second data, and to generate a single PHY data unit that includes the plurality of spatial streams.

In yet another embodiment, a method for generating PHY data units for transmission via a communication channel includes receiving first data and second data that correspond to a unit of audio, video, and/or image information, and encoding and modulating the first data and the second data so that a resulting data rate of the first data is less than a resulting data rate of the second data. Also, the method includes generating a first sub-PHY data unit that includes the first data, and generating a second sub-PHY data unit that includes the second data. The method additionally includes generating one of i) an aggregated PHY data unit that includes the first sub-PHY data unit and the second sub-PHY data unit, or ii) a burst of PHY data units that includes the first sub-PHY data unit and the second sub-PHY data unit.

In still another embodiment, another PHY processing unit for generating PHY data units for transmission via a communication channel is disclosed. The PHY processing unit is configured to receive first data and second data that correspond to a unit of audio, video, and/or image information, and to encode and modulate the first data and the second data so that a resulting data rate of the first data is less than a resulting data rate of the second data. The PHY processing unit is additionally configured to generate a first sub-PHY data unit that includes the first data, and to generate a second sub-PHY data unit that includes the second data. The PHY processing unit is also configured to generate one of i) an aggregated PHY data unit that includes the first sub-PHY data unit and the second sub-PHY data unit, or ii) a burst of PHY data units that includes the first sub-PHY data unit and the second sub-PHY data unit.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. In one embodiment, the first communication protocol is the IEEE 802.11ac Standard, now in the process of being standardized. In other embodiments, the first communication protocol is a protocol other than the IEEE 802.11ac Standard. For ease of explanation, the first communication protocol is also referred to herein as a very high throughput (VHT) protocol. In some embodiments or scenarios, one or more client stations in the vicinity of the AP are not configured to operate according to the first communication protocol, but are configured to operate according to at least a second communication protocol. Therefore, in some embodiments, the AP is additionally configured to operate with client stations according to at least a second communication protocol. For ease of explanation, the second communication protocol is also referred to herein as a legacy protocol.

In an embodiment the VHT protocol supports transmission of different data according to different modulation and coding schemes (MCSs), and where the different data should be transmitted at about the same time, i.e., the latency between the different data should be low e.g., below a threshold. For example, the different data may correspond to a same unit of information. In one embodiment, the different data correspond to most significant bits (MSB) and least significant bits (LSB) of video data in a frame of video. In another embodiment, the different data correspond to first image data providing a first level of resolution of an image and second image data to increase the first level of resolution to a second level of resolution of the image. In another embodiment, the different data correspond to first data providing a first level of quality of a unit of video or image, and/or audio information and second data to increase the quality to a second level of quality of the unit of information.

In an embodiment, first data is transmitted at a lower MCS to increase reliability (i.e., a probability that the first data is correctly received by a receiver) with respect to second data transmitted at a higher MCS. In other words, the first data is transmitted at a lower MCS with respect to transmission of the second data to increase the reliability of the first data with respect to the reliability of the second data.

Figure 1:
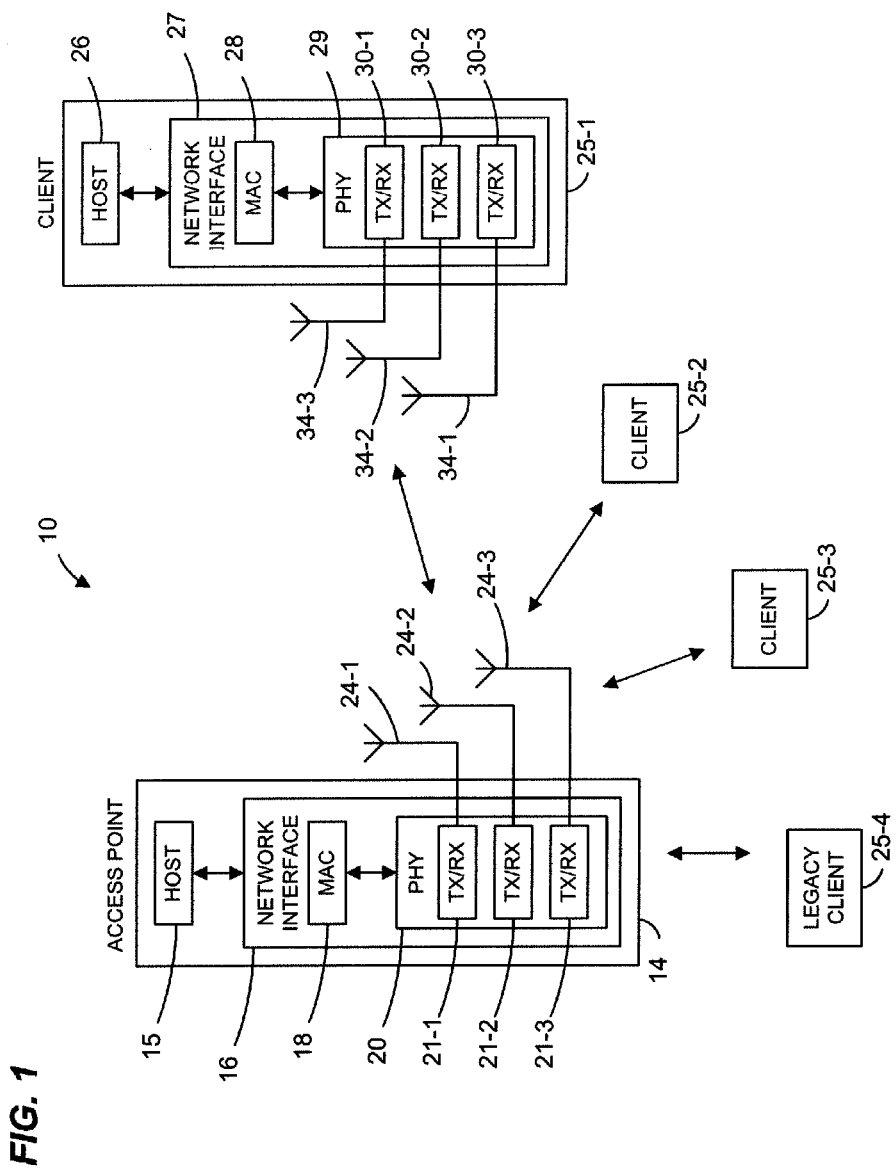
FIG. 1 is a block diagram of an example wireless local area network (WLAN) 10, according to an embodiment.

FIG. 1 is a block diagram of an example wireless local area network (WLAN) 10, according to an embodiment. An AP 14 includes a host processor 15 coupled to a network interface 16. The network interface 16 includes a medium access control (MAC) unit 18 and a physical layer (PHY) unit 20. The PHY processing unit 20 includes a plurality of transceivers 21, and the transceivers are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments. In one embodiment, the MAC processing unit 18 and the PHY processing unit 20 are configured to operate according to the VHT protocol. In another embodiment, the MAC processing unit 18 and the PHY processing unit 20 are also configured to operate according to a legacy protocol (e.g. the IEEE 802.11n Standard, the IEEE 802.11g Standard, the IEEE 802.11a Standard, etc.).

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the VHT protocol. In some embodiments, at least one of the client stations 25 is not configured to operate according to the VHT protocol but is configured to operate according to the legacy protocol (referred to herein as a "legacy client station").

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or both of the client stations 25-2 and 25-3 has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

According to an embodiment, the client station 25-4 is a legacy client station, i.e. the client station 25-4 is not enabled to receive and fully decode a data unit that is transmitted by the AP 14 or another client station 25 according to the VHT protocol. Similarly, according to an embodiment, the legacy client station 25-4 is not enabled to transmit data units according to the VHT protocol. On the other hand, the legacy client station 25-4 is enabled to receive and fully decode and transmit data units according to the legacy protocol.

In various embodiments, the PHY processing unit 20 of the AP 14 is configured to generate data units conforming to the VHT protocol. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the VHT protocol, according to an embodiment.

In various embodiments, the PHY processing unit 29 of the client device 25-1 is configured to generate data units conforming to the VHT protocol. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the VHT protocol, according to an embodiment.

Figure 2:
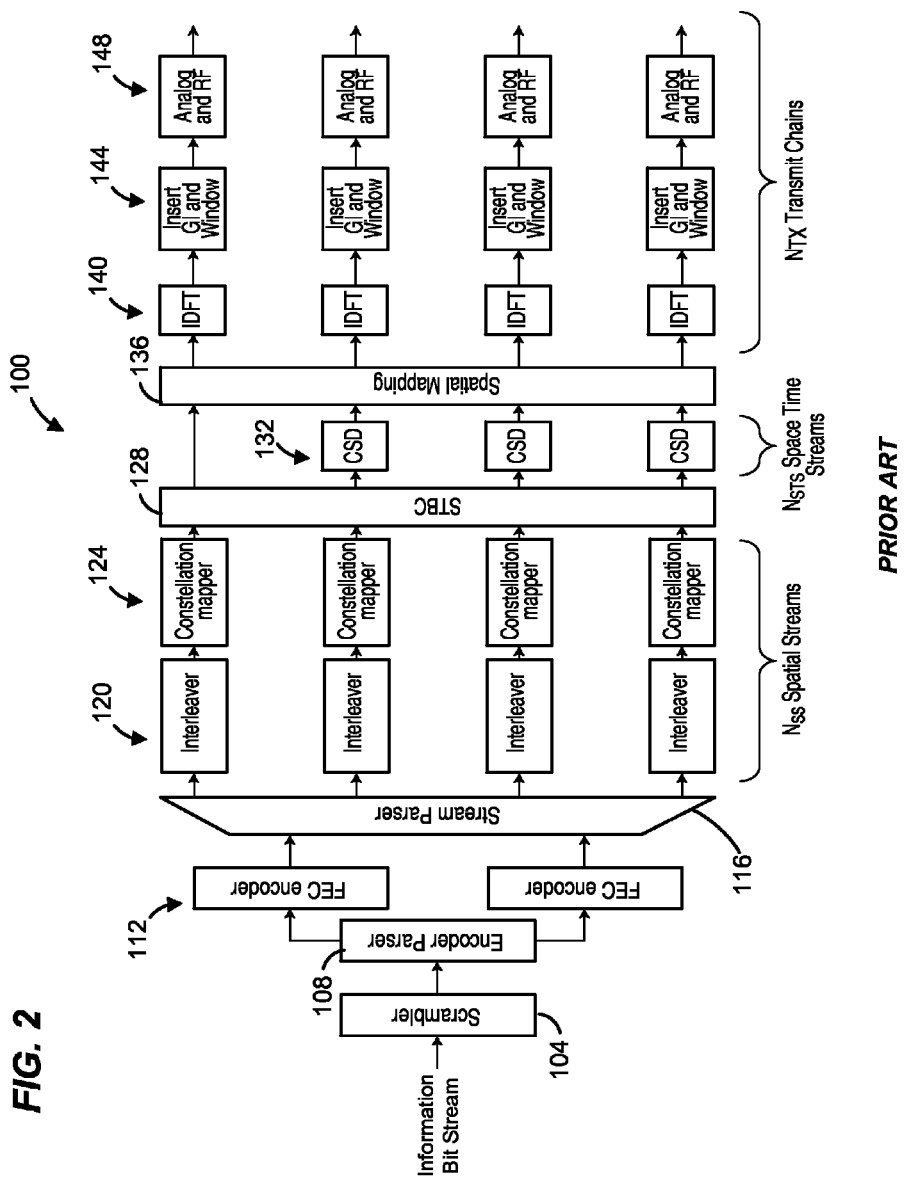
FIG. 2 is a block diagram of a prior art physical layer (PHY) processing unit.

FIG. 2 is a block diagram of a prior art PHY processing unit 100 configured to operate according to the IEEE 802.11n Standard. The PHY processing unit 100 is included in the legacy client 25-4 (FIG. 1), in one embodiment. The PHY processing unit 100 includes a scrambler 104 that generally scrambles an information bit stream to reduce the occurrence of long sequences of ones or zeros and to generate a scrambled stream. An encoder parser 108 demultiplexes the scrambled stream into one or two encoder input streams corresponding to one or two forward error correction (FEC) encoders 112. Each encoder 112 encodes the corresponding input stream to generate a corresponding encoded stream.

A stream parser 116 parses the one or two encoded streams into up to four spatial streams. Corresponding to each spatial stream, an interleaver 120 interleaves bits of the spatial stream (i.e., changes the order of the bits) to prevent long sequences of adjacent noisy bits from entering a decoder at the receiver. Also corresponding to each spatial stream, a constellation mapper 124 maps an interleaved sequence of bits to constellation points corresponding to different subcarriers of an orthogonal frequency division multiplexing (OFDM) symbol.

A space-time block coding unit 128 receives the constellation points corresponding to the one or more spatial streams and spreads the spatial streams to a greater number of space-time streams. The space-time block coding unit 128 can be controlled to merely pass through spatial streams without performing space-time block coding. For example, when the number of spatial streams is four, the space-time block coding unit 128 does not perform space-time block coding.

A plurality of cyclic shift diversity (CSD) units 132 insert cyclic shifts into all but one of the space-time streams (if more than one space-time stream). The cyclic shifts are to prevent unintentional beamforming.

A spatial mapping unit 136 maps the space-time streams to transmit chains. Spatial mapping may include: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

Each output of the spatial mapping unit 136 corresponds to a transmit chain, and each output of the spatial mapping unit 136 is operated on by an inverse discrete Fourier transform (IDFT) unit 140 that converts a block of constellation points to a time-domain signal.

Outputs of the IDFT units 140 are provided to guard interval (GI) insertion and windowing units 144 that prepend, to an OFDM symbol, a circular extension of the OFDM symbol and smooth the edges of each symbol to increase spectral decay. Outputs of the GI insertion and windowing units 144 are provided to analog and radio frequency (RF) units that convert the signals to analog signals and upconvert the signals to RF frequencies for transmission. The IEEE 802.11n Standard specifies that signals are transmitted in either a 20 MHz bandwidth channel or a 40 MHz bandwidth channel.

Referring again to FIG. 1, the AP 14 and the clients 25-1, 25-2, 25-3 are configured to transmit and receive signals that conform to the VHT protocol. In some embodiments, the VHT protocol permits transmission in a channel having a bandwidth of at least 80 MHz. For instance, in some embodiments, the VHT protocol permits transmission in a channel having a bandwidth of 80 MHz, 120 MHz, 160 MHz, etc. In some embodiments, the VHT protocol permits transmission with different bandwidths such as two or more of 80 MHz, 120 MHz, 160 MHz, etc. In some embodiments, the VHT protocol also permits transmission in a channel having a bandwidth of 20 MHz and a bandwidth having a bandwidth of 40 MHz.

Figure 3:
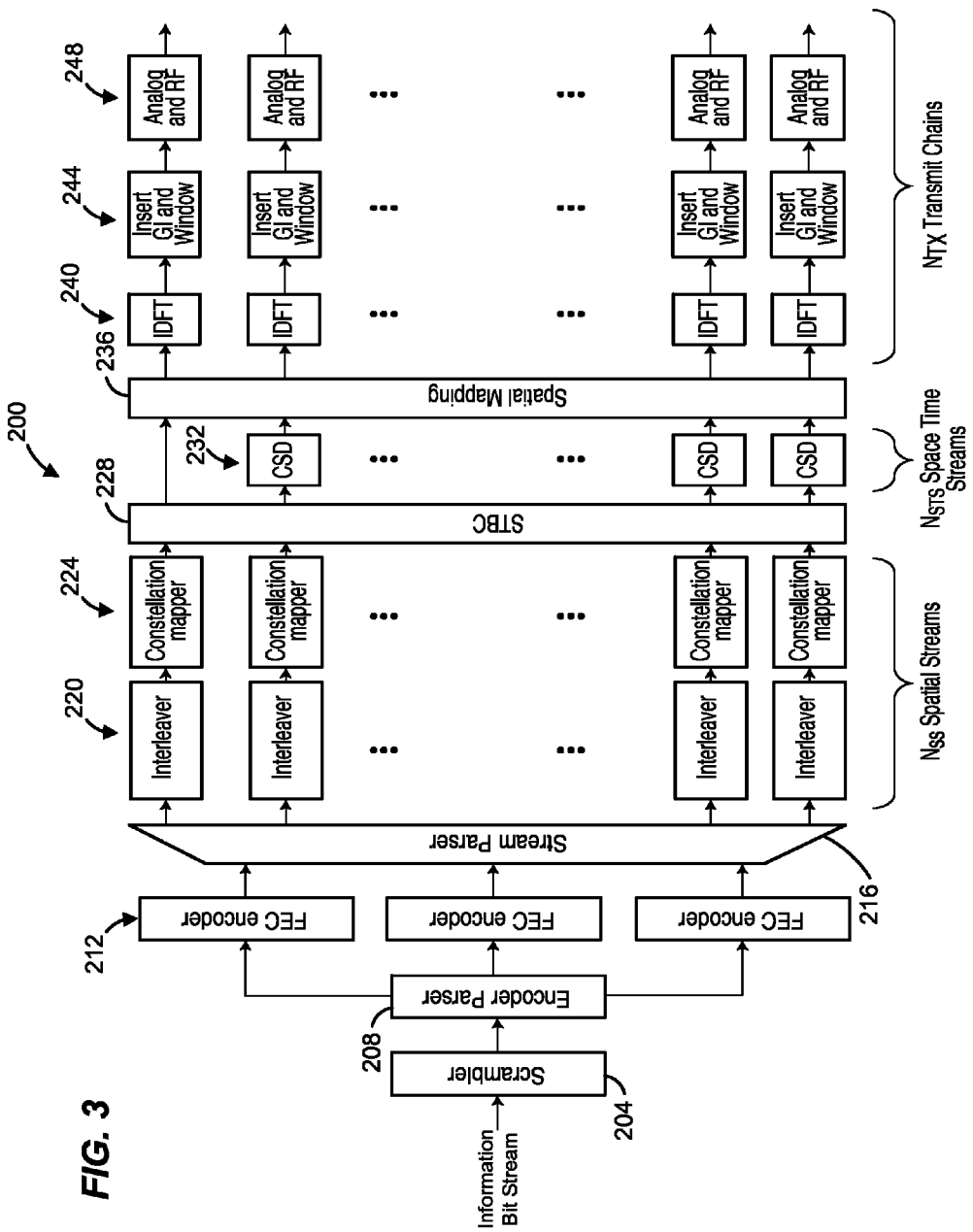
FIG. 3 is a block diagram of a PHY processing unit, according to an embodiment.

FIG. 3 is a generalized block diagram of an example PHY processing unit 200 configured to operate according to the VHT protocol, according to an embodiment. More detailed PHY processing unit structures for applying different MCSs to different data is described below.

The PHY processing unit 200 includes a scrambler 204 that generally scrambles an information bit stream to reduce the occurrence of long sequences of ones or zeros. The IEEE 802.11a Standard and the 802.11n Standard specify a 127-length scrambler with a generator polynomial S(x) given by:

$$S(x)=x^7+x^4+1 \qquad \text{Equ. 1}$$

The polynomial S(x) is also utilized for descrambling an information bit stream at the receiver. In one embodiment, the scrambler 204 implements a 127-length scrambler with a generator polynomial S(x) given by Equ. 1. Also in this embodiment, a receiver configured to operate according to the first communication protocol also utilizes the generator polynomial S(x) given by Equ. 1. In other embodiments, the scrambler 204 implements a length different than 127 and/or utilizes a generator polynomial different than the generator polynomial S(x) given by Equ. 1. In another embodiment, the scrambler 204 is replaced with a plurality of parallel scramblers located after an encoder parser 208. In this embodiment, each of the parallel scramblers has a respective output coupled to a respective one of a plurality of FEC encoders 212. The plurality of parallel scramblers operate simultaneously on a demultiplexed stream. In another embodiment, the scrambler 204 comprises a plurality of parallel scramblers and a demultiplexer that demultiplexes the information bit stream to the plurality of parallel scramblers, which operate simultaneously on demultiplexed streams. These embodiments may be useful, in some scenarios, to accommodate wider bandwidths and thus higher operating clock frequencies.

The encoder parser 208 is coupled to the scrambler 204. The encoder parser 208 demultiplexes the information bit stream into one or more encoder input streams corresponding to one or more FEC encoders 212. In another embodiment with a plurality of parallel scramblers, the encoder parser 208 demultiplexes the information bit stream into a plurality of streams corresponding to the plurality of parallel scramblers.

Each encoder 212 encodes the corresponding input stream to generate a corresponding encoded stream. In one embodiment, each FEC encoder 212 includes a binary convolutional encoder. In another embodiment, each FEC 212 encoder includes a binary convolutional encoder followed by a puncturing block. In another embodiment, each FEC encoder 212 includes a low density parity check (LDPC) encoder. In yet another embodiment, each FEC encoder 212 includes a Reed-Solomon (RS) encoder.

Different numbers of encoders 212 may operate in parallel depending on the data rate of a MCS. In one embodiment, the PHY processing unit 200 includes five encoders 212, and one, two, three, four, or five encoders operate simultaneously depending on the particular MCS being utilized. In another embodiment, the PHY processing unit 200 includes four encoders 212, and one, two, three, or four encoders operate simultaneously depending on the particular MCS being utilized. In another embodiment, the PHY processing unit 200 includes four encoders 212, and one, two, or four encoders operate simultaneously depending on the particular MCS being utilized. In another embodiment, the PHY processing unit 200 includes three encoders 212, and one, two, or three encoders operate simultaneously depending on the particular MCS being utilized. In another embodiment, the PHY processing unit 200 includes up to eight encoders 212, and one, two, three, four, five, six, seven, or eight encoders operate simultaneously depending on the particular MCS being utilized. In another embodiment, the PHY processing unit 200 includes up to eight encoders 212, and one, two, three, four, six, or eight encoders operate simultaneously depending on the particular MCS being utilized. In another embodiment, the PHY processing unit 200 includes up to eight encoders 212, and one, two, four, six, or eight encoders operate simultaneously depending on the particular MCS being utilized.

In one embodiment, the number of encoders utilized increments according 450 Mbps step sizes in the data rate. In other embodiments, the number of encoders utilized increments according to a step size in the data rate that is between approximately 400 and 500 Mbps. In another embodiment, the number of encoders utilized increments according to a step size in the data rate that is between approximately 400 and 600 Mbps. In one embodiment, the step size is 600 Mbps.

A stream parser 216 parses the one or more encoded streams into one or more spatial streams for separate interleaving and mapping into constellation points. In one embodiment, the stream parser 216 uses the output of each operating encoder 212 in a round robin fashion, using S bits from each operating encoder per cycle, where:

$$S = \sum_{i=1}^{N_{SS}} \max\left\{1, \frac{N_{BPSCS}(i_{SS})}{2}\right\},$$ Equ. 2 and where $N_{SS}$ is the number of spatial streams and $N_{BPSCS}(i_{SS})$ is the number of coded bits per carrier for spatial stream $i_{SS}$.

Corresponding to each spatial stream, an interleaver 220 interleaves bits of the spatial stream (i.e., changes the order of the bits) to prevent long sequences of adjacent noisy bits from entering a decoder at the receiver. Compared to the interleavers 120 (FIG. 2) of the IEEE 802.11n Standard compliant PHY processing unit 100, the interleavers 220 are extended to cover longer bit streams corresponding to wider bandwidth OFDM symbols, such as 80 MHz, 120 MHz, 160 MHz, etc. In some embodiments of the PHY processing unit 200, a transmit chain includes multiple radios so that a wideband OFDM symbol is transmitted as multiple sub-OFDM symbols via respective radios. For example, an 80 MHz-wide OFDM symbol is transmitted via two radios, each having a bandwidth of 40 MHz. As another example, a 160 MHz-wide OFDM symbol is transmitted via two radios, each having a bandwidth of 80 MHz. As another example, a 160 MHz-wide OFDM symbol is transmitted via four radios, each having a bandwidth of 40 MHz. In one embodiment in which a wideband OFDM symbol is transmitted via multiple radios, multiple interleavers 220 may be utilized such that a separate interleaver 220 corresponds to each radio used to transmit the wide-band OFDM symbol.

Also corresponding to each spatial stream, a constellation mapper 224 maps an interleaved sequence of bits to constellation points corresponding to different subcarriers of an OFDM symbol. More specifically, for each spatial stream, the constellation mapper 224 translates every bit sequence of length $\log_2(M)$ into one of M constellation points. The constellation mapper 224 handles different numbers of constellation points depending on the MCS being utilized. In an embodiment, the constellation mapper 224 is a quadrature amplitude modulation (QAM) mapper that handles M=2, 4, 16, 64, 256, and 1024. In other embodiments, the constellation mapper 224 handles different modulation schemes corresponding to M equaling different subsets of at least two values from the set {2, 4, 16, 64, 256, 1024}.

A space-time block coding unit 228 receives the constellation points corresponding to the one or more spatial streams and spreads the spatial streams to a greater number of space-time streams. The space-time block coding unit 228 can be controlled to merely pass through spatial streams without performing space-time block coding. For example, when the number of spatial streams is equal to the maximum number of space-time streams, the space-time block coding unit 228 does not perform space-time block coding. In some embodiments, the space-time block coding unit 228 is omitted.

A plurality of CSD units 232 insert cyclic shifts into all but one of the space-time streams (if more than one space-time stream). The cyclic shifts are to prevent unintentional beamforming. For ease of explanation, the inputs to the CSD units 232 are referred to as space-time streams even in embodiments in which the space-time block coding unit 228 is omitted. In one embodiment, the frequency CDD values applied on each of four space-time streams is the same as the frequency CDD values specified in the IEEE 802.11n Standard. In another embodiment, the frequency CDD values applied on each of four space-time streams is different than the frequency CDD values specified in the IEEE 802.11n Standard. In one embodiment, if more than four space-time streams are utilized, the frequency CDD values are defined similarly to the definitions in the IEEE 802.11n Standard.

In one embodiment, the time CDD values applied on each of four space-time streams is the same as the time CDD values specified in the IEEE 802.11n Standard. In another embodiment, the time CDD values applied on each of four space-time streams is different than the time CDD values specified in the IEEE 802.11n Standard. In one embodiment, if more than four space-time streams are utilized, the time CDD values are defined to be values within the range [−200 0] ns. In another embodiment, if more than four space-time streams are utilized, the time CDD values are defined to be values within a suitable range different than the range [−200 0] ns.

A spatial mapping unit 236 maps the space-time streams to transmit chains. In various embodiments, spatial mapping includes one or more of: 1) direct mapping, in which constellation points from each space-time stream are mapped directly onto transmit chains (i.e., one-to-one mapping); 2) spatial expansion, in which vectors of constellation point from all space-time streams are expanded via matrix multiplication to produce inputs to the transmit chains; and 3) beamforming, in which each vector of constellation points from all of the space-time streams is multiplied by a matrix of steering vectors to produce inputs to the transmit chains.

In one embodiment, the spatial mapping unit 236 applies a steering matrix Q (e.g., multiplies an $N_{STS} \times 1$ signal vector s by Q, i.e., Qs), where Q has a size ($N_{TX} \times N_{STS}$), where $N_{TX}$ is the number of transmit chains and $N_{STS}$ is the number of space-time streams. When beamforming is utilized, the matrix Q is generated based on the MIMO channel between the transmitter and the receiver. In one embodiment, $N_{TX}$ has a maximum value of 8. In another embodiment, $N_{TX}$ has a maximum value of 16. In other embodiments, $N_{TX}$ has a different maximum value such as 4, 32, 64, etc.

Each output of the spatial mapping unit 236 corresponds to a transmit chain, and each output of the spatial mapping unit 236 is operated on by an IDFT unit 240 that converts a block of constellation points to a time-domain signal.

Outputs of the IDFT units 240 are provided to GI insertion and windowing units 244 that prepend, to each OFDM symbol, a circular extension of the OFDM symbol and smooth the edges of each symbol to increase spectral decay. Outputs of the GI insertion and windowing units 244 are provided to analog and RF units 248 that convert the signals to analog signals and upconvert the signals to RF frequencies for transmission. As will be discussed below, the signals are transmitted in a 20 MHz, a 40 MHz, an 80 MHz, a 120 MHz, or a 160 MHz bandwidth channel, in various embodiments and/or scenarios.

Example communication channels. OFDM symbol formats, padding techniques. MCS selection techniques, interleaving techniques, etc., that are utilized by the PHY processing unit, in various embodiments, are described in U.S. patent application Ser. No. 12/846,681, entitled "Methods and Apparatus for WLAN Transmission," filed on Jul. 29, 2010, which is hereby incorporated by reference herein in its entirety.

Figure 4:
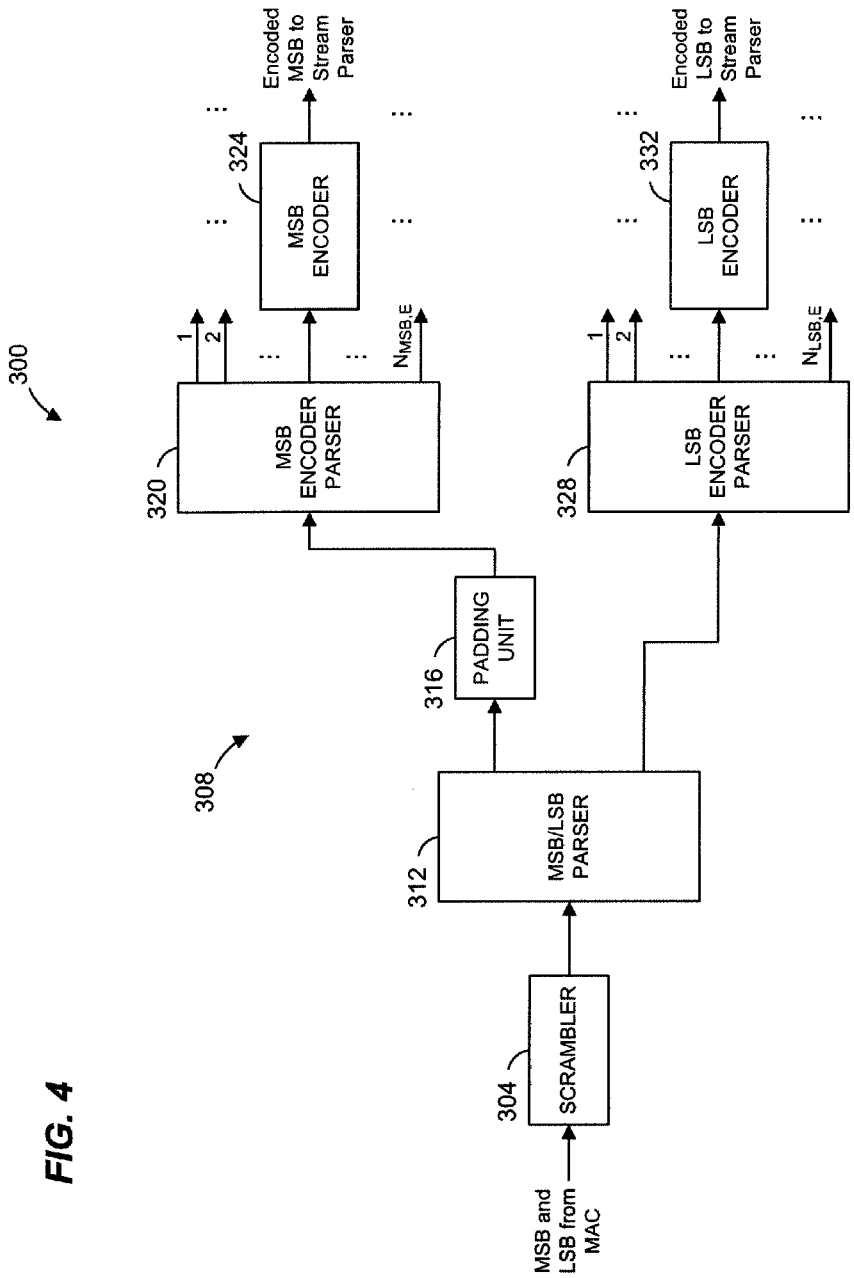
FIG. 4 is a block diagram of a portion of a PHY processing unit, according to an embodiment.

FIG. 4 is a block diagram of a portion 300 of an embodiment of a PHY processing unit that applies different MCSs to different data received from a MAC processing unit. FIG. 4 is described in the context of video data having MSB and LSB for ease of explanation. In other embodiments, a similar apparatus may be utilized with other types of data to be differently encoded.

LSB and MSB corresponding to video data are provided to a scrambler 304. In one embodiment, the LSB and the MSB are provided by a MAC processing unit. In one embodiment, the LSB and the MSB are provided in a single MAC protocol data unit (MPDU) and the MAC processing unit also provides to the PHY processing unit an indication of a boundary between the LSB and the MSB. In one embodiment, the LSB is provided in a first sub-frame of an aggregated MPDU (AMPDU), and the MSB is provided in a second sub-frame of the AMPDU. In another embodiment, the LSB and the MSB are provided in separate MPDUs.

The scrambler 304 generally scrambles the LSB and the MSB to reduce the occurrence of long sequences of ones or zeros. The scrambler operates in a manner such as described above with respect to FIG. 2, in an embodiment.

The output of the scrambler 304 is provided to an encoder parser 308. The encoder parser 308 demultiplexes the scrambled information bit stream into a plurality of encoder input streams corresponding to a plurality of encoders. In particular, the encoder parser 308 includes an LSB/MSB parser 312 that demultiplexes the scrambled information bit stream into an LSB stream and an MSB stream.

In one embodiment, the encoder parser 308 includes a padding unit 316 to pad the MSB stream so that, after encoding, the MSB stream has a same duration as the LSB stream.

The encoder parser 308 also includes an MSB encoder parser 320 that parses the MSB stream to one or more MSB encoders 324. In one embodiment, the MSB encoder parser 320 utilizes a round robin approach to distribute MSB bits to the one or more MSB encoders 324.

If multiple MSB encoders 324 are utilized, the number ($N_{MSB,E}$) of MSB encoders 324 operating in parallel on the MSB stream generally depends on the data rate of an MCS for the MSB stream. In one embodiment, the PHY processing unit includes five MSB encoders 324, and one, two, three, four, or five MSB encoders 324 operate simultaneously depending on the particular MCS being utilized. In another embodiment, the PHY processing unit includes four MSB encoders 324, and one, two, three, or four MSB encoders 324 operate simultaneously depending on the particular MCS being utilized. In another embodiment, the PHY processing unit includes four MSB encoders 324, and one, two, or four MSB encoders 324 operate simultaneously depending on the particular MCS being utilized. In another embodiment, the PHY processing unit includes three MSB encoders 324, and one, two, or three MSB encoders 324 operate simultaneously depending on the particular MCS being utilized. In another embodiment, the PHY processing unit includes up to eight MSB encoders 324, and one, two, three, four, five, six, seven, or eight MSB encoders 324 operate simultaneously depending on the particular MCS being utilized. In another embodiment, the PHY processing unit includes up to eight MSB encoders 324, and one, two, three, four, six, or eight MSB encoders 324 operate simultaneously depending on the particular MCS being utilized. In another embodiment, the PHY processing unit includes up to eight MSB encoders 324, and one, two, four, six, or eight MSB encoders 324 operate simultaneously depending on the particular MCS being utilized. In another embodiment, $N_{MSB,E}=1$.

The encoder parser 308 also includes an LSB encoder parser 328 that parses the LSB stream to one or more LSB encoders 332. In one embodiment, the LSB encoder parser 328 utilizes a round robin approach to distribute LSB bits to the one or more LSB encoders 332. If multiple LSB encoders 332 are utilized, the number ($N_{LSB,E}$) of LSB encoders 332 operating in parallel on the LSB stream generally depends on the data rate of an MCS for the LSB stream in a manner similar to the MSB encoders 324 discussed above. In some embodiments, $N_{LSB,E}>1$. In one embodiment, $N_{LSB,E}=1$.

In one embodiment, if the data rate for the MSB is less than 400 megabits per second (Mbps) and the date rate for the LSB is between 300 Mbps and 600 Mbps, then one MSB encoder 324 is utilized and two LSB encoders 332 are utilized.

The one or more MSB encoders 324 encode the MSB stream at a lower encoding rate than an encoding rate at which the one or more LSB encoders 332 encode the LSB stream. In one embodiment, each MSB encoder 324 and each LSB encoder 332 includes a corresponding block convolutional code (BCC) encoder. In this embodiment, the one or more MSB encoders 324 provide a BCC rate of 1/2, whereas the one or more LSB encoders 332 provide a BCC rate of 2/3, 3/4, or 5/6.

In another embodiment, each of the one or more MSB encoders 324 includes a corresponding BCC encoder followed by a corresponding interleaver and a corresponding block encoder, such as a Reed-Solomon (RS) encoder or another suitable block encoder. In this embodiment, the BCC encoder(s) of the one or more MSB encoders 324 encode at the same rate as BCC encoder(s) of the one or more LSB encoders 332, but the RS encoder(s) of the one or more MSB encoders 324 provide a lower encoding rate for the MSB as compared to the encoding rate of the LSB.

Referring to FIG. 3, the outputs of the one or more MSB encoders 324 are provided to the stream parser 216. Similarly, the outputs of the one or more LSB encoders 332 are provided to the stream parser 216. In one embodiment, the stream parser 216 uses the output of each encoder (each of the MSB encoder(s) 324 and the LSB encoder(s) 332) in a round robin fashion. In another embodiment, the stream parser 216 uses a smaller number of coded bits from MSB encoder(s) 324 (lower data rate), than from LSB encoder(s) 332.

In one resulting PHY protocol data unit (PPDU), the original MSB and LSB bits received from the MAC processing unit may not occupy the same duration in the PPDU if no padding is utilized. For example, after encoding, MSB bits in each PPDU are much shorter than LSB bits, so even with lower encoding rate, the duration of the MSB is still less than the duration of the LSB, in the absence of padding. In some embodiments the PHY processing unit and/or the MAC processing unit pads zeros to the end of the MSB. In some embodiments, the MAC processing unit includes an indication of the true length of the MSB (i.e., the length of the MSB without padding) so that a receiver can determine the true length of the MSB. In one embodiment, the MAC processing unit includes the MSB in a subframe of an A-MPDU, and the receiver determines the true length of MSB subframe by a MAC header of the subframe, for example.

Figure 5:
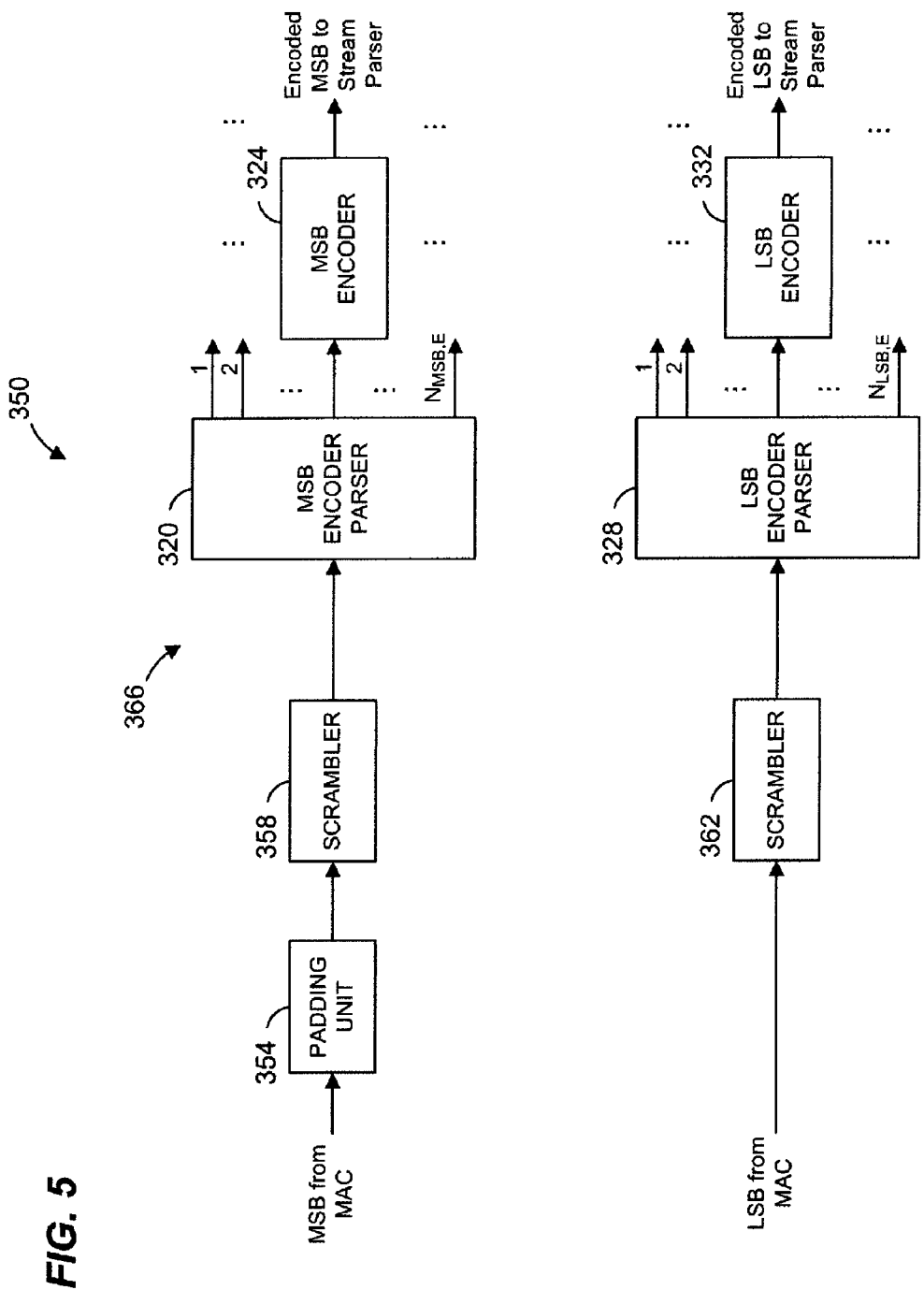
FIG. 5 is a block diagram of a portion of a PHY processing unit, according to another embodiment.

FIG. 5 is a block diagram of a portion 350 of another embodiment of a PHY processing unit that applies different MCSs to different data received from a MAC processing unit. FIG. 5 is described in the context of video data having MSB and LSB for ease of explanation. In other embodiments, a similar apparatus may be utilized with other types of data to be differently encoded. FIG. 5 includes some like-numbered blocks with respect to FIG. 4, and the like-numbered blocks of FIG. 5 are not discussed in detail.

The MSB corresponding to video data are provided to a padding unit 354. In one embodiment, additional padding is performed in the MAC processing unit. In another embodiment, the padding unit 354 is omitted and padding is performed in the MAC processing unit. The MSB is provided to a scrambler 358, and the LSB corresponding to video data are provided to a scrambler 362. In one embodiment, the LSB and the MSB are provided by a MAC processing unit. In one embodiment, the LSB and the MSB are provided in a single MPDU and the MAC processing unit also provides to the PHY processing unit an indication of a boundary between the LSB and the MSB. In one embodiment, the LSB is provided in a first sub-frame of an AMPDU, and the MSB is provided in a second sub-frame of the AMPDU. In another embodiment, the LSB and the MSB are provided in separate MPDUs.

Each of the scrambler 358 and the scrambler 362 generally scrambles the MSB and the LSB, respectively, to reduce the occurrence of long sequences of ones or zeros. The scramblers 358, 362 each operate in a manner such as described above with respect to FIG. 2, in an embodiment.

The outputs of the scramblers 358, 362 are provided to an encoder parser 366. The encoder parser 366 demultiplexes the scrambled information bit stream into a plurality of encoder input streams corresponding to a plurality of encoders. In particular, the encoder parser 366 includes the MSB encoder parser 328 and the LSB encoder parser 320. Comparing FIGS. 4 and 5, the encoder parser 366 omits the MSB/LSB parser 312 and the padding unit 316, in an embodiment.

Figure 6:
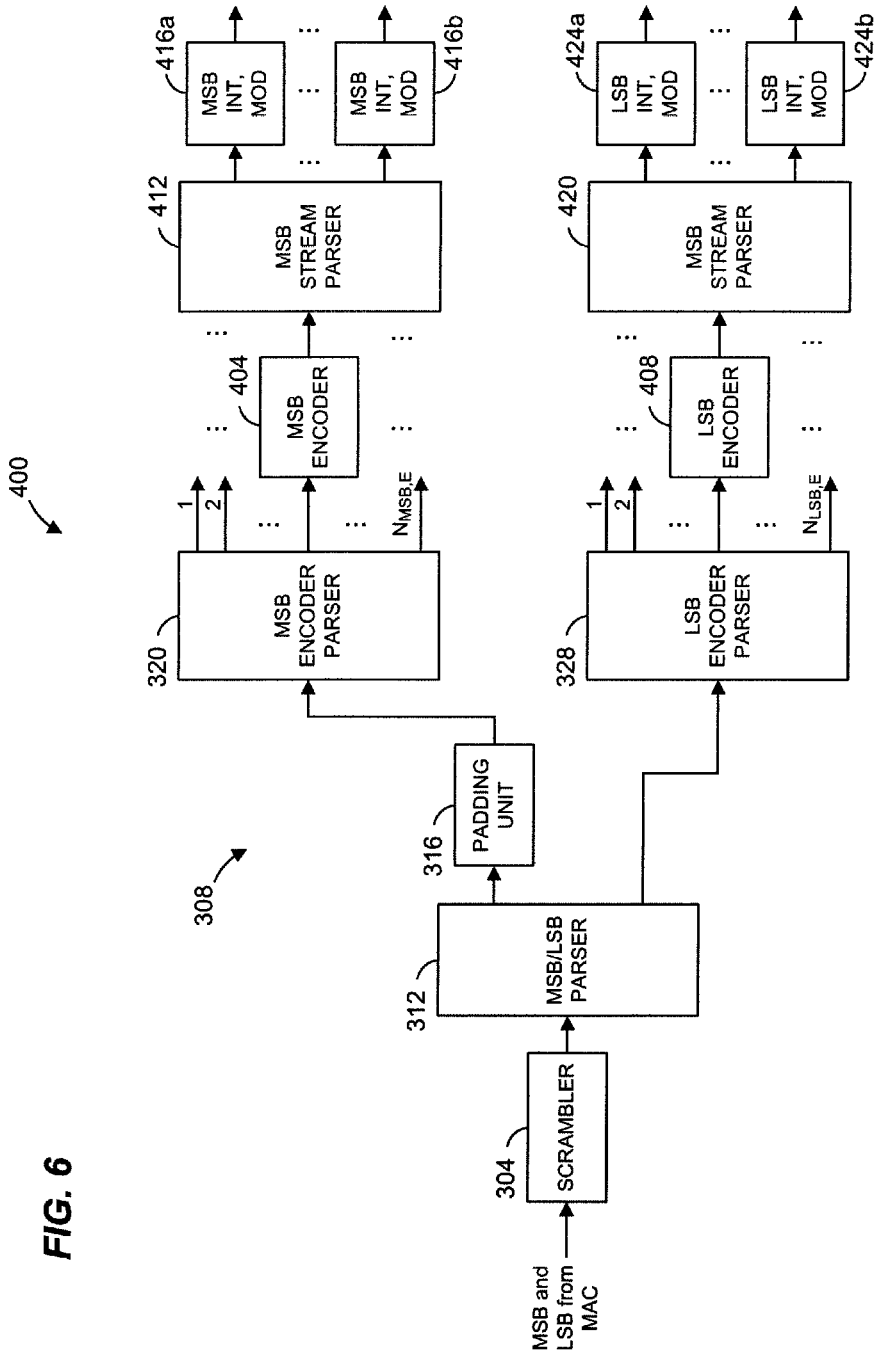
FIG. 6 is a block diagram of a portion of a PHY processing unit, according to another embodiment.

FIG. 6 is a block diagram of a portion 400 of another embodiment of a PHY processing unit that applies different MCSs to different data received from a MAC processing unit. FIG. 6 is described in the context of video data having MSB and LSB for ease of explanation. In other embodiments, a similar apparatus may be utilized with other types of data to be differently encoded. FIG. 6 includes some like-numbered blocks with respect to FIG. 4, and the like-numbered blocks of FIG. 6 are not discussed in detail.

In the embodiment of FIG. 6, MSB and LSB data are parsed to different spatial streams, and different modulation is applied to the MSB and LSB streams. For example, in one embodiment. MSB data is mapped to a smaller constellation (i.e., less points in the constellation) as compared to the constellation to which LSB data is mapped. In one embodiment, MSB data is also encoded at a lower encoding rate as compared to the encoding rate at which LSB data is encoded.

The MSB encoder parser 320 parses the MSB stream to one or more MSB encoders 404. In one embodiment, the MSB encoder parser 320 utilizes a round robin approach to distribute MSB bits to the one or more MSB encoders 404. If multiple MSB encoders 404 are utilized, the number ($N_{MSB,E}$) of MSB encoders 408 operating in parallel on the MSB stream generally depends on the data rate of an MCS for the MSB stream. In some embodiments. $N_{MSB,E}>1$. In one embodiment. $N_{MSB,E}=1$.

The encoder parser 308 also includes an LSB encoder parser 328 that parses the LSB stream to one or more LSB encoders 408. In one embodiment, the LSB encoder parser 328 utilizes a round robin approach to distribute LSB bits to the one or more LSB encoders 408. If multiple LSB encoders 408 are utilized, the number ($N_{LSB,E}$) of LSB encoders 408 operating in parallel on the LSB stream generally depends on the data rate of an MCS for the LSB stream. In some embodiments, $N_{LSB,E}>1$. In one embodiment, $N_{LSB,E}=1$.

In one embodiment, the encoding rate of the one or more MSB encoders 404 is the same as the encoding rate of the one or more LSB encoders 408. In another embodiment, the one or more MSB encoders 404 are the same as or similar to the one or more MSB encoders 324 of FIG. 4, and the one or more LSB encoders 408 are the same as or similar to the one or more LSB encoders 332 of FIG. 4. In this embodiment, the encoding rate of the one or more MSB encoders 404 is lower than the encoding rate of the one or more LSB encoders 408.

Outputs of the one or more MSB encoders 404 are provided to an MSB stream parser 412. The MSB stream parser 412 parses outputs of the one or more MSB encoders 404 to one or more spatial streams, and each spatial stream is interleaved and mapped to a constellation. In one embodiment, the MSB stream parser 412 uses the output of each MSB encoder 404 in a round robin fashion.

Each spatial stream output of the MSB stream parser 412 is provided to a corresponding interleaver and modulator or mapper 416 that maps the MSB spatial streams to a constellation.

Outputs of the one or more LSB encoders 408 are provided to an LSB stream parser 420. The LSB stream parser 420 parses outputs of the one or more LSB encoders 408 to one or more spatial streams, and each spatial stream is interleaved and mapped to a constellation. In one embodiment, the LSB stream parser 420 uses the output of each LSB encoder 408 in a round robin fashion.

Each spatial stream output of the LSB stream parser 420 is provided to a corresponding interleaver and modulator or mapper 424 that maps the LSB spatial streams to a constellation.

In one embodiment, each MSB mapper 416 maps to a smaller constellation as compared to the constellation to which the LSB mapper 420 maps. In other words, the constellation of the MSB mapper 416 has less points than the constellation of the LSB mapper 420. In some embodiments, the MSB mapper 416 provides binary phase shift keying (BPSK) modulation (i.e., two constellation points) whereas the LSB mapper 420 provides quadrature phase shift keying (QPSK) modulation (i.e., four constellation points), 16 quadrature amplitude modulation (16-QAM) (i.e., 16 constellation points). 64-QAM (i.e., 64 constellation points), or 256-QAM (i.e., 256 constellation points), as just a few examples.

Outputs of and the interleaver(s) and mapper(s) 416 and the interleaver(s) and mapper(s) 424 are provided to the STBC block 228 (FIG. 3) if included. If the STBC block 228 is not included, the outputs of and the interleaver(s) and mapper(s) 416 and the interleaver(s) and mapper(s) 424 are provided to the CSD units 232 and the spatial mapper 236.

In one embodiment, the PHY processing unit includes only one MSB encoder 404 and utilizes only one MSB spatial stream. In this embodiment, the MSB encoder parser 320 and the MSB stream parser are omitted.

Similar to the PHY processing units discussed with respect to FIGS. 4 and 5, in one resulting PPDU, the original MSB and LSB bits received from the MAC processing unit may not occupy the same duration in the PPDU if no padding is utilized. For example, after encoding, MSB bits in each PPDU are much shorter than LSB bits, so even with lower encoding rate, the duration of the MSB is still less than the duration of the LSB, in the absence of padding. In some embodiments the PHY processing unit and/or the MAC processing unit pads zeros to the end of the MSB. In some embodiments, the MAC processing unit includes an indication of the true length of the MSB (i.e., the length of the MSB without padding) so that a receiver can determine the true length of the MSB. In one embodiment, the MAC processing unit includes the MSB in a subframe of an A-MPDU, and the receiver determines the true length of MSB subframe by a MAC header of the subframe, for example.

Figure 7:
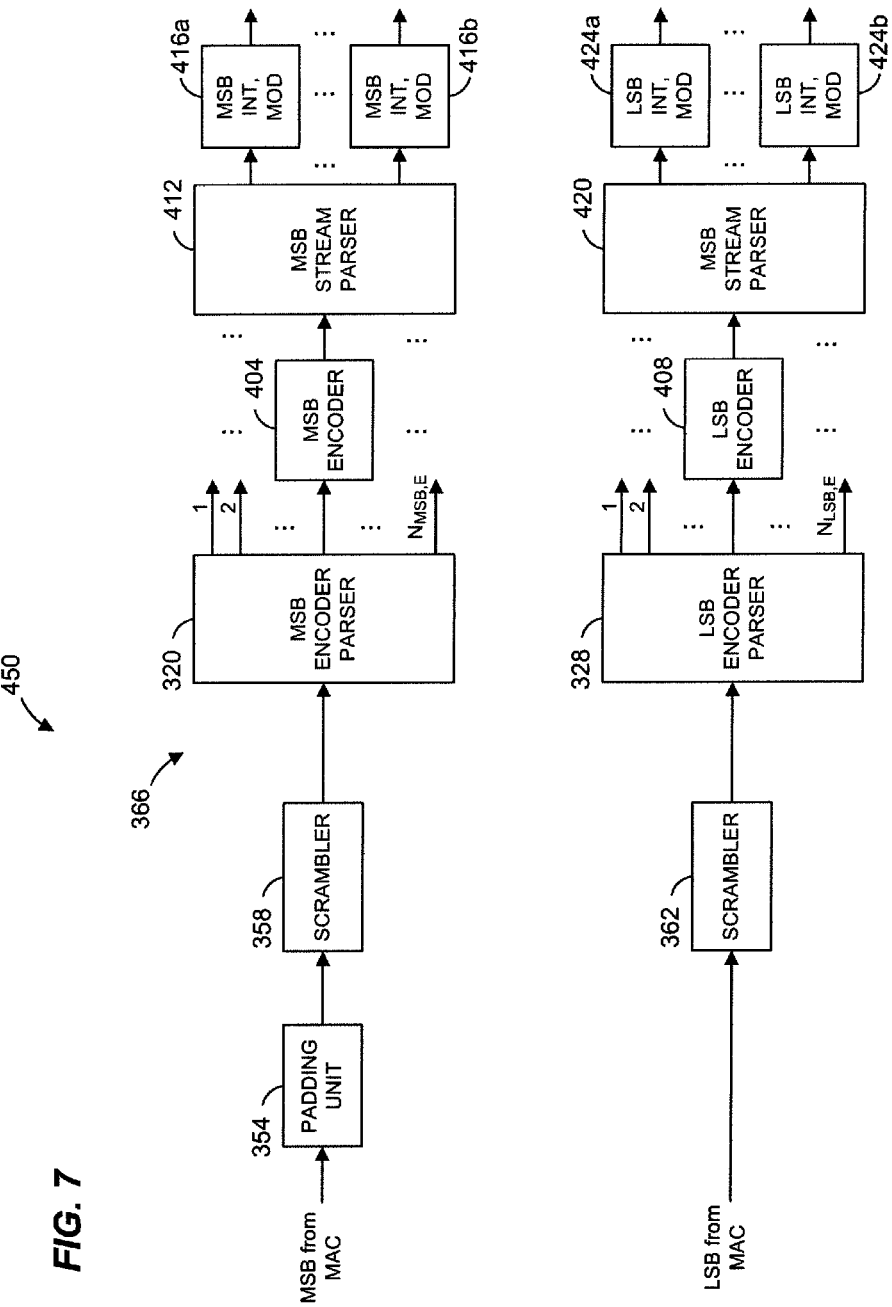
FIG. 7 is a block diagram of a portion of a PHY processing unit, according to another embodiment.

FIG. 7 is a block diagram of a portion 450 of another embodiment of a PHY processing unit that applies different MCSs to different data received from a MAC processing unit. In other embodiments, a similar apparatus may be utilized with other types of data to be differently encoded besides video data. FIG. 7 includes some like-numbered blocks with respect to FIGS. 5 and 6, and the like-numbered blocks of FIG. 7 are not discussed in detail. The PHY processing unit of FIG. 7 omits the MSB/LSB parser 312 and includes two scramblers 358, 362.

With the example PHY processing units discussed with respect to FIGS. 4-7, the encoded and modulated MSB and LSB data are included within a single PPDU. At least in some embodiments, implementations, and/or scenarios, providing the MSB and LSB data within the single PPDU helps to reduce the amount of buffering required at the receiver. At least in some embodiments, implementations, and/or scenarios, providing the MSB and LSB data within the single PPDU helps to reduce the overall delay of the video because the receiver is not required to first receive MSB data in a first PPDU and then wait through at least a short interframe space (SIFS) interval and through a preamble of a second PPDU to receive the corresponding LSB in the second PPDU, for example.

Figure 8:
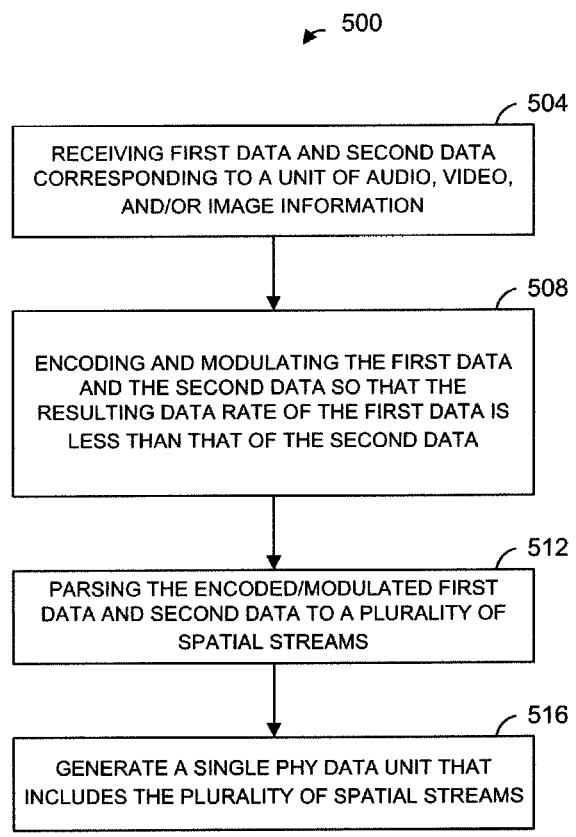
FIG. 8 is a flow diagram of a method for generating a single PHY data unit that includes first data and second data at different encoding rates and/or modulations, according to an embodiment.

FIG. 8 is a flow diagram of an example method 500 for generating a single PHY data unit that includes first data and second data at different encoding rates and/or modulations, according to an embodiment. The first data and second data correspond to a unit of audio, video, and/or image information. For example, in one embodiment, the first data is MSB of a video frame and the second data is LSB of the video frame.

The first data is encoded and/or modulated such that it can be received and decoded correctly at a receiver with a higher reliability as compared to the second data, which is differently encoded and/or differently modulated (low reliability data). For example, in one embodiment, the first data is transmitted at a lower MCS to increase reliability (i.e., a probability that the first data is correctly received by a receiver) with respect to the second data transmitted at a higher MCS. In other words, the first data is transmitted at a lower MCS with respect to transmission of the second data to increase the reliability of the first data with respect to the reliability of the second data.

In some embodiments, the method 500 is implemented by a PHY processing unit such as described with respect to FIGS. 4-7. In other embodiments, the method 500 is implemented by a suitable PHY processing unit other than the PHY processing units of FIGS. 4-7. The method 500 will be described with respect to FIGS. 4-7 for ease of explanation.

At block 504, first data and second data corresponding to a unit of audio, video, and/or image information are received. For example, a PHY processing unit receives from a MAC unit MSB and LSB corresponding to a video frame. In one embodiment, the LSB and the MSB are received in a single MPDU along with an indication of a boundary between the LSB and the MSB. In one embodiment, the LSB is received in a first sub-frame of an AMPDU, and the MSB is received in a second sub-frame of the AMPDU. In another embodiment, the LSB and the MSB are received in separate MPDUs.

At block 508, the first data and the second data are encoded and modulated so that the resulting data rate of the first data is less than that of the second data. In one embodiment, the first data is encoded with a lower encoding rate as compared to an encoding rate of the second data. In another embodiment, the first data is modulated according to a constellation having less points than a constellation according to which the second data is modulated. In another embodiment, the first data is encoded with a lower encoding rate as compared to an encoding rate of the second data, and the first data is modulated according to a constellation having less points than a constellation according to which the second data is modulated.

At block 512, after encoding and modulation, the first data and the second data are parsed to a plurality of spatial streams. In one embodiment, each of at least some of the spatial streams includes both first data and second data. In another embodiment, each spatial stream includes only first data or only second data.

At block 516, a single PHY data unit that includes the plurality of spatial streams is generated.

Figure 9:
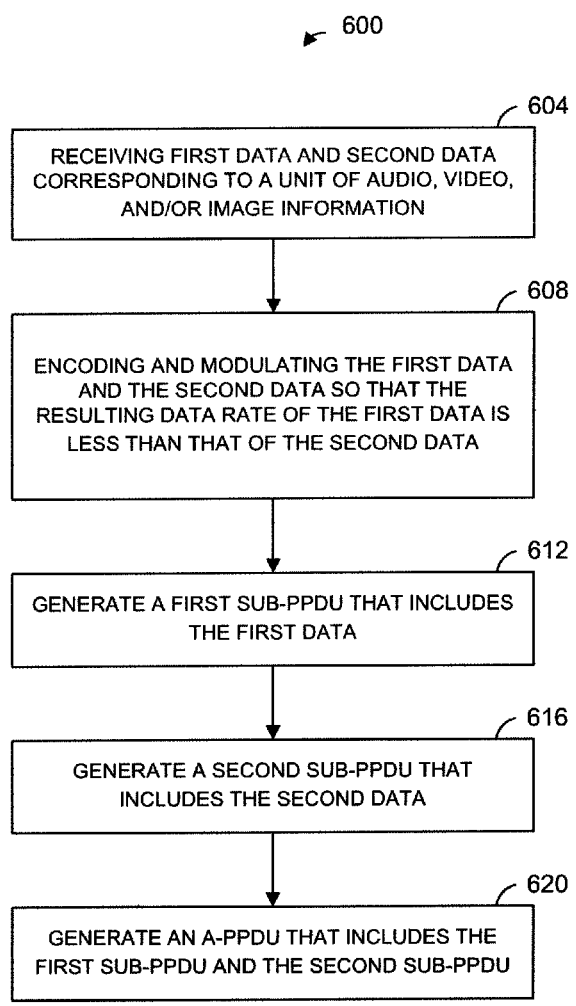
FIG. 9 is a flow diagram of another method for generating a single PHY data unit that includes first data and second data at different encoding rates and/or modulations, according to another embodiment.

FIG. 9 is a flow diagram of another example method 600 for generating a single PHY data unit that includes first data and second data at different encoding rates and/or modulations, according to an embodiment. The first data and second data correspond to a unit of audio, video, and/or image information. For example, in one embodiment, the first data is MSB of a video frame and the second data is LSB of the video frame.

The first data is encoded and/or modulated such that it can be received and decoded correctly at a receiver with a higher reliability as compared to the second data, which is differently encoded and/or differently modulated (low reliability data). For example, in one embodiment, the first data is transmitted at a lower MCS to increase reliability (i.e., a probability that the first data is correctly received by a receiver) with respect to the second data transmitted at a higher MCS. In other words, the first data is transmitted at a lower MCS with respect to transmission of the second data to increase the reliability of the first data with respect to the reliability of the second data.

The method 600 need not be implemented by a PHY processing unit such as described with respect to FIGS. 4-7. Rather, in other embodiments, the method 600 is implemented by a suitable PHY processing unit that is configured to generate an aggregated PPDU (A-PPDU) such that different sub-PPDUs within the A-PPDU have different MCSs, for example. As one example, the method 600 is generated by a PHY processing unit having a structure such as the PHY processing unit 200 of FIG. 3 and configured to generate an A-PPDU such that different sub-PPDUs within the A-PPDU have different MCSs.

At block 604, first data and second data corresponding to a unit of audio, video, and/or image information are received. For example, a PHY processing unit receives from a MAC unit MSB and LSB corresponding to a video frame. In one embodiment, the LSB and the MSB are received in a single MPDU along with an indication of a boundary between the LSB and the MSB. In one embodiment, the LSB is received in a first sub-frame of an AMPDU, and the MSB is received in a second sub-frame of the AMPDU. In another embodiment, the LSB and the MSB are received in separate MPDUs.

At block 608, the first data and the second data are encoded and modulated so that the data rate of the first data is less than that of the second data. In one embodiment, the first data is encoded with a lower encoding rate as compared to an encoding rate of the second data. In another embodiment, the first data is modulated according to a constellation having less points than a constellation according to which the second data is modulated. In another embodiment, the first data is encoded with a lower encoding rate as compared to an encoding rate of the second data, and the first data is modulated according to a constellation having less points than a constellation according to which the second data is modulated.

At block 612, after the first data is encoded and modulated, a first sub-PPDU that includes the first data is generated. At block 616, after the second data is encoded and modulated, a second sub-PPDU that includes the second data is generated.

At block 620, the A-PPDU that includes the first sub-PPDU and the second sub-PPDU is generated.

Figure 10:
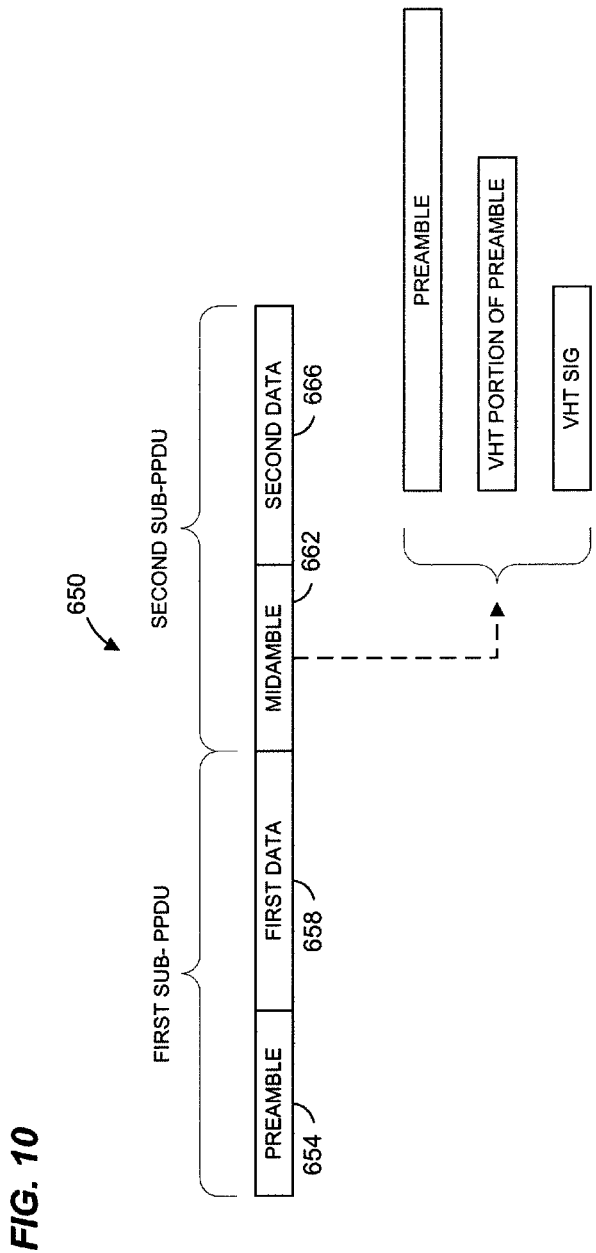
FIG. 10 is a block diagram of an example aggregated PHY data unit that is generated according to the method of FIG. 9, according to one embodiment.

FIG. 10 is a block diagram of an example A-PPDU 650 that is generated according to the method 600 of FIG. 9, in one embodiment. The A-PPDU 650 includes the first PPDU and the second PPDU. The first PPDU includes a preamble 654 and a payload 658 that includes the first data. The second PPDU include a midamble 662 and a payload 666 that includes the second data.

In one embodiment, the preamble 654 includes a signal field (VHT-SIG) that includes an indicator (e.g., in a subfield of the VHT-SIG) that indicates whether a subsequent sub-PPDU follows the first sub-PPDU in the A-PPDU 650. In one embodiment, the VHT-SIG additionally or alternatively includes an indicator of whether the second sub-PPDU is the same size as the first sub-PPDU. In one embodiment, the VHT-SIG additionally or alternatively includes an indicator of whether the second sub-PPDU includes a legacy portion to facilitate legacy device spoofing (e.g., a legacy short training field (L-STF) and a legacy long training field (L-LTF)).

In one embodiment, the midamble 662 has a format the same as or similar to the preamble 654. In this embodiment, the midamble 662 includes the legacy portion to facilitate legacy device spoofing and a VHT portion. The VHT portion includes VHT-SIG field. In one embodiment, the VHT-SIG field of the midambles 662 includes an indicator (e.g., in a subfield of the VHT-SIG) that indicates whether a subsequent sub-PPDU follows the second sub-PPDU in the A-PPDU 650. In one embodiment, the VHT-SIG additionally or alternatively includes an indicator of whether a subsequent sub-PPDU is the same size as the second sub-PPDU. In one embodiment, the VHT-SIG additionally or alternatively includes an indicator of whether a subsequent sub-PPDU includes the legacy portion to facilitate legacy device spoofing.

In another embodiment, the midamble 662 omits the legacy portion. In another embodiment, the midamble 662 omits the legacy portion and portions of the VHT portion, but includes the VHT-SIG field.

Figure 11:
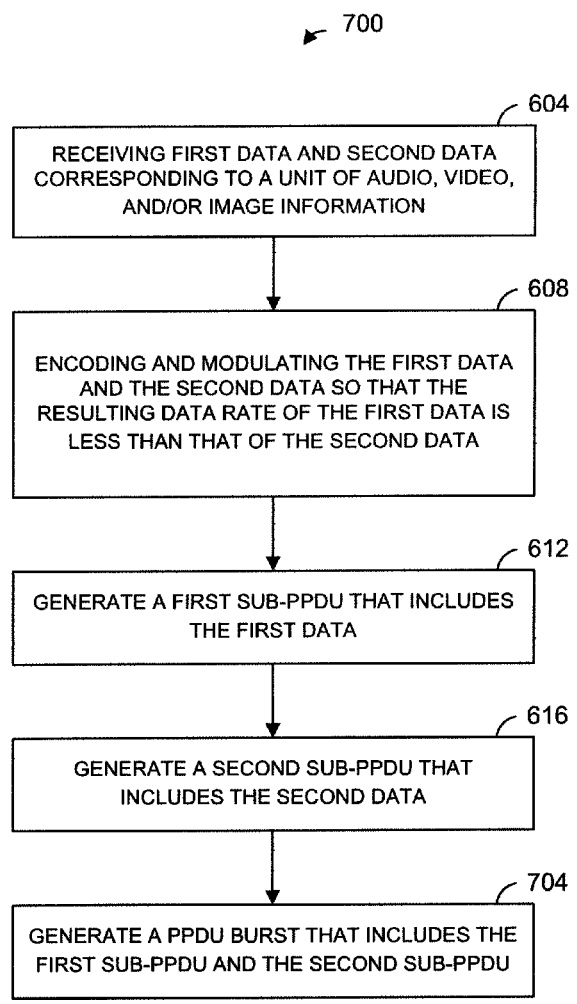
FIG. 11 is a flow diagram of a method for generating a burst of PHY data units that includes first data and second data at different encoding rates and/or modulations, according to an embodiment.

FIG. 11 is a flow diagram of another example method 700 for generating a burst of PHY data units that include first data and second data at different throughput rates, according to an embodiment. The first data and second data correspond to a unit of audio, video, and/or image information. For example, in one embodiment, the first data is MSB of a video frame and the second data is LSB of the video frame.

The first data is encoded and/or modulated such that it can be received and decoded correctly at a receiver with a higher reliability as compared to the second data, which is differently encoded and/or differently modulated (low reliability data). For example, in one embodiment, the first data is transmitted at a lower MCS to increase reliability (i.e. a probability that the first data is correctly received by a receiver) with respect to the second data transmitted at a higher MCS. In other words, the first data is transmitted at a lower MCS with respect to transmission of the second data to increase the reliability of the first data with respect to the reliability of the second data.

The method 700 need not be implemented by a PHY processing unit such as described with respect to FIGS. 4-7. Rather, in other embodiments, the method 700 is implemented by a suitable PHY processing unit that is configured to generate a burst of PPDUs such that different sub-PPDUs within the burst have different MCSs, for example. As one example, the method 700 is generated by a PHY processing unit having a structure such as the PHY processing unit 200 of FIG. 3 and configured to generate a burst of PPDUs such that different sub-PPDUs within the burst have different MCSs.

The method 700 is similar to the method 600 of FIG. 9, and like-numbered blocks are not discussed in detail.

At block 704, a burst of PPDUs that includes the first sub-PPDU and the second sub-PPDU is generated.

Figure 12:
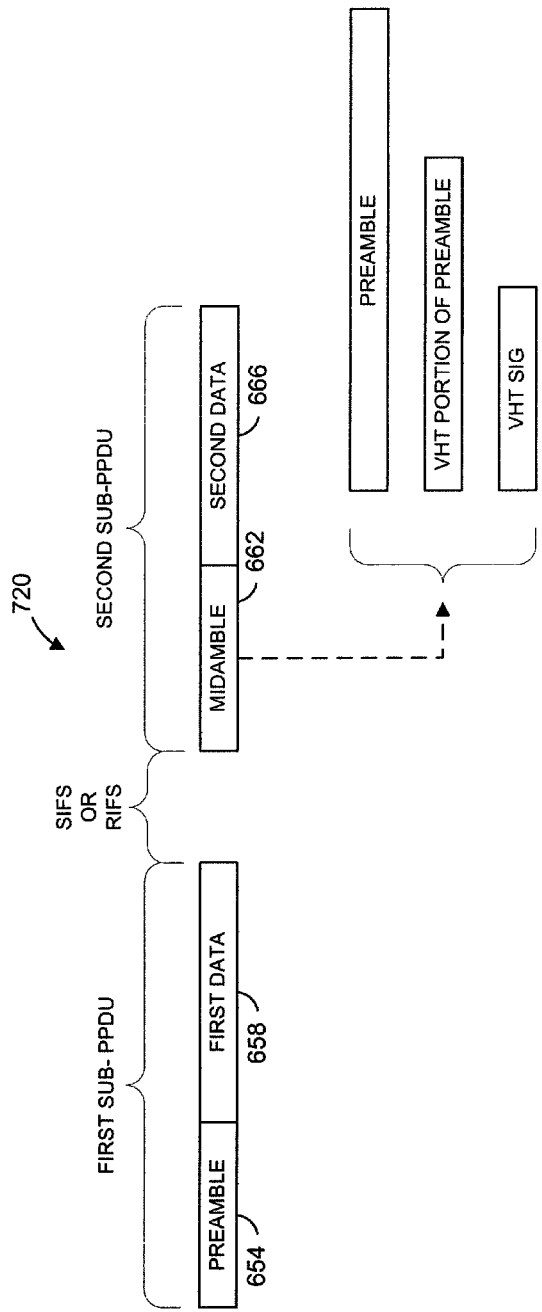
FIG. 12 is a block diagram of an example burst of PHY data units that is generated according to the method of FIG. 11, according to one embodiment.

FIG. 12 is a block diagram of an example burst of PPDUs 720 that is generated according to the method 700 of FIG. 11, in one embodiment. FIG. 12 is similar to FIG. 10, and like-numbered blocks are not discussed in detail.

The burst 720 includes the first sub-PPDU and the second sub-PPDU. The first sub-PPDU includes the preamble 654 and the payload 658 that includes the first data. The second PPDU include the midambles 662 and the payload 666 that includes the second data. The first sub-PPDU and the second sub-PPDU are separated by a SIFS or a reduced interframe space (RIFS).

Example PHY preamble format techniques that are utilized for the preamble 654 in various embodiments are described in U.S. patent application Ser. No. 12/758,603, entitled "Physical Layer Frame Format for WLAN," filed on Apr. 12, 2010, which is hereby incorporated by reference herein in its entirety. Example PHY preamble and midamble format techniques that are utilized for the preamble 654 and the midamble 662 in various embodiments are described in U.S. patent application Ser. No. 12/841,772, entitled "Midamble for WLAN PHY Frames," filed on Jul. 22, 2010, and U.S. patent application Ser. No. 12/869,491, entitled "Method and Apparatus for Multi-User Frame Aggregation," filed on Aug. 26, 2010, which are both hereby incorporated by reference herein in their entireties.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a physical layer (PHY) data unit for transmission via a communication channel, the method comprising:
   receiving first data and second data that correspond to a unit of audio, video, and/or image information;
   encoding and modulating the first data and the second data so that a resulting data rate of the first data is less than a resulting data rate of the second data, wherein encoding and modulating the first data and the second data includes
      modulating the first data according to a first constellation having a first number of constellation points, and
      modulating the second data according to a second constellation that differs from the first constellation at least by having a second number of constellation points higher than the first number of constellation points;
   parsing the first data and the second data to a plurality of spatial streams such that each spatial stream of the plurality of spatial streams includes only first data or only second data; and
   generating a single PHY data unit that includes the plurality of spatial streams.

2. A method according to claim 1, wherein encoding and modulating the first data and the second data so that the resulting data rate of the first data is less than the resulting data rate of the second data comprises:
   encoding the first data at a first coding rate; and
   encoding the second data at a second coding rate higher than the first coding rate.

3. A method according to claim 1, wherein at least one spatial stream includes first data and second data.

4. A physical layer (PHY) processing unit for generating a PHY data unit for transmission via a communication channel, the PHY processing unit comprising:
   a first encoder to encode first data that corresponds to a unit of audio, video, and/or image information;
   a second encoder to encode second data that corresponds to the unit of audio, video, and/or image information;
   a first modulator to modulate the first data according to a first constellation having a first number of constellation points;
   a second modulator to modulate the second data according to a second constellation that differs from the first constellation at least by having a second number of constellation points higher than the first number of constellation points; and
   a stream parser to parse the first data and the second data to a plurality of spatial streams such that each spatial stream of the plurality of spatial streams includes only first data or only second data,
   wherein the PHY processing unit is configured to
      encode and modulate the first data and the second data so that a resulting data rate of the first data is less than a resulting data rate of the second data, and
      generate a single PHY data unit that includes the plurality of spatial streams.

5. A PHY processing unit according to claim 4, further comprising a data parser to parse the first data to the first encoder and to parse the second data to the second encoder.

6. A PHY processing unit according to claim 4, further comprising a first encoder parser to parse the second data to a first plurality of encoders including the second encoder.

7. A PHY processing unit according to claim 6, further comprising a second encoder parser to parse the first data to a second plurality of encoders including the first encoder.

8. A PHY processing unit according to claim 4, wherein the stream parser comprises:
   a first stream parser to parse the first data to a first set of spatial streams; and
   a second stream parser to parse the second data to a second set of spatial streams.

9. A PHY processing unit according to claim 8, wherein the padding system includes a second padding unit to add second padding bits after parsing the information bits to the plurality of encoders.

* * * * *